US012792356B2

(12) United States Patent
Takeoka et al.

(10) Patent No.: US 12,792,356 B2
(45) Date of Patent: Nov. 10, 2026

(54) PROCESSOR FOR CONTROLLING PIPELINE PROCESSING BASED ON JUMP INSTRUCTION, AND PROGRAM STORAGE MEDIUM

(71) Applicants: TAKEOKA LAB CORPORATION, Tokyo (JP); TOKYO ELECTRON LIMITED, Tokyo (JP)

(72) Inventors: Shozo Takeoka, Takatsuki-city (JP); Yoshio Kinoshita, Tokyo (JP)

(73) Assignees: TAKEOKA LAB CORPORATION, Tokyo (JP); TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 18/876,798

(22) PCT Filed: May 30, 2023

(86) PCT No.: PCT/JP2023/020054
§ 371 (c)(1),
(2) Date: Dec. 19, 2024

(87) PCT Pub. No.: WO2024/029174
PCT Pub. Date: Feb. 8, 2024

(65) Prior Publication Data

US 2026/0003630 A1 Jan. 1, 2026

(30) Foreign Application Priority Data

Aug. 5, 2022 (JP) ................................ 2022-125913

(51) Int. Cl.
*G06F 9/38* (2018.01)
*G06F 9/32* (2018.01)

(52) U.S. Cl.
CPC ............. *G06F 9/382* (2013.01); *G06F 9/321* (2013.01)

(58) Field of Classification Search
CPC ................................ G06F 9/382; G06F 9/321
See application file for complete search history.

(56) References Cited

U.S. PATENT DOCUMENTS 4,777,587 A 10/1988 Case et al.
5,721,855 A 2/1998 Hinton et al.
(Continued)

FOREIGN PATENT DOCUMENTS

JP H02-287624 A 11/1990
JP H05-334083 A 12/1993
(Continued)

OTHER PUBLICATIONS

Jul. 18, 2025 Extended Search Report issued in European Patent Application No. 23849735.8.
(Continued)

*Primary Examiner* — Michael J Metzger
(74) *Attorney, Agent, or Firm* — Oliff PLC

(57) ABSTRACT

Provided is a processor controlling pipeline processing to avoid the occurrence of pipeline bubbles as much as possible even when executing jump instruction. The present processor executes pipeline processing in which: an instruction fetcher fetching a machine-language instruction based on a memory address set in a program counter; a decoder decoding the machine-language instruction output from the instruction fetcher into control information; and an executer executing the control information output from the decoder, are connected, and the present processor comprises: a table describing a head address and a head machine-language instruction for each destination of jump; and a pipeline controller setting, when the executer executing a control information of a jump, an address specifying a second machine-language instruction at a destination of the jump into the program counter by using the table, while to input
(Continued)

a head machine-language instruction at the destination of the jump to the decoder.

7 Claims, 7 Drawing Sheets

(56) References Cited

U.S. PATENT DOCUMENTS

| | | | | |
|---|---|---|---|---|
| 5,956,758 | A | 9/1999 | Henzinger et al. | |
| 5,964,869 | A | 10/1999 | Talcott et al. | |
| 6,167,509 | A | 12/2000 | Sites et al. | |
| 6,327,704 | B1 | 12/2001 | Mattson, Jr. et al. | |
| 6,826,674 | B1 | 11/2004 | Sato | |
| 8,667,476 | B1 | 3/2014 | Jung | |
| 10,592,248 | B2 | 3/2020 | Havlir | |
| 2001/0042173 | A1* | 11/2001 | Bala | G06F 11/3471 711/125 |
| 2002/0116663 | A1 | 8/2002 | Wood et al. | |
| 2003/0088636 | A1 | 5/2003 | Nakamura | |
| 2004/0225869 | A1 | 11/2004 | Pagni et al. | |
| 2005/0144427 | A1 | 6/2005 | Col et al. | |
| 2006/0010314 | A1* | 1/2006 | Xu | G06F 11/1446 713/2 |
| 2007/0074010 | A1 | 3/2007 | Nakajima | |
| 2008/0052501 | A1 | 2/2008 | Kwak | |
| 2009/0172642 | A1 | 7/2009 | Lai | |
| 2009/0177874 | A1 | 7/2009 | Terashima | |
| 2010/0185835 | A1 | 7/2010 | Leijten et al. | |
| 2013/0283017 | A1* | 10/2013 | Wilkerson | G06F 9/323 712/225 |
| 2014/0201509 | A1 | 7/2014 | Jackson | |
| 2014/0281440 | A1 | 9/2014 | Tu et al. | |
| 2015/0039863 | A1 | 2/2015 | Chiao et al. | |
| 2017/0212739 | A1 | 7/2017 | Catiller | |
| 2019/0121646 | A1 | 4/2019 | Grant et al. | |
| 2019/0310860 | A1* | 10/2019 | Vastano | G06F 8/658 |
| 2020/0081716 | A1 | 3/2020 | Yalavarti et al. | |
| 2021/0303300 | A1 | 9/2021 | Smith et al. | |
| 2022/0156082 | A1 | 5/2022 | McDonald et al. | |

FOREIGN PATENT DOCUMENTS

| | | | |
|---|---|---|---|
| JP | H06-103067 | A | 4/1994 |
| JP | H09-171463 | A | 6/1997 |
| JP | 2000-029696 | A | 1/2000 |
| JP | 2007-094813 | A | 4/2007 |
| JP | 2008-52684 | A | 3/2008 |
| JP | 2009-163624 | A | 7/2009 |
| KR | 20010080367 | A | 8/2001 |
| KR | 10-2008-0018679 | A | 2/2008 |
| KR | 10-2009-0092753 | A | 9/2009 |
| KR | 20180132044 | A | 12/2018 |
| KR | 10-2019-0020036 | A | 2/2019 |

OTHER PUBLICATIONS

Oct. 17, 2023 International Search Report issued in International Patent Application No. PCT/JP2023/030696.

Oct. 17, 2023 Written Opinion of the International Searching Authority issued in International Patent Application No. PCT/JP2023/030696.

U.S. Appl. No. 19/111,422, filed Mar. 13, 2025 in the name of Shozo Takeoka et al.

Apr. 10, 2025 Office Action issued in Korean Patent Application No. 10-2025-7001400.

Aug. 15, 2023 International Search Report issued in International Patent Application No. PCT/JP2023/020054.

Aug. 15, 2023 Written Opinion issued in International Patent Application No. PCT/JP2023/020054.

Oct. 31, 2025 Office Action issued in U.S. Appl. No. 19/111,422.

Sep. 22, 2025 Extended Search Report issued in European Patent Application No. 23879462.2.

"Cortex-M3/M4F Instruction Set Technical User's Manual", Texas Instruments Incorporated, pp. 1-221, Nov. 4, 2011.

Sep. 29, 2025 Office Action issued in Korean Patent Application No. 10-2025-7001400.

Feb. 24, 2026 Office Action issued in U.S. Appl. No. 19/111,422.

Apr. 16, 2026 Office Action issued in European Patent Application No. 23879462.2.

Apr. 22, 2026 Office Action issued in Indian Patent Application No. 202427102567.

Jul. 21, 2026 Office Action issued in U.S. Appl. No. 19/111,422.

Jul. 9, 2026 Office Action issued in Korean Patent Application No. 10-2025-7001400.

Jul. 3, 2026 Office Action issued in European Patent Application No. 23 849 735.8.

Intrater, G. and Spillinger, I. "Performance Evaluation of a Decoded Instruction Cache for Variable Instruction Length Computers," Transactions on Computers, vol. 43, No. 10, Oct. 1994, pp. 1140-1150.

[Tip] Jump Table—Tip / C/C++. <https://blog.naver.com/nawoo/220179415518.> Nov. 12, 2014.

[C/C++] switch jump table. Posted by byulbit. <https://byulbitdom.tistory.com/entry/CC-switch?-jump-table.> Nov. 7, 2012.

Sep. 10, 2026 Examination Report issued in Indian Patent Application No. 202527019609.

* cited by examiner

PROCESSOR FOR CONTROLLING PIPELINE PROCESSING BASED ON JUMP INSTRUCTION, AND PROGRAM STORAGE MEDIUM

TECHNICAL FIELD

The present disclosure relates to the technology of a processor that executes pipeline processing. In particular, the present disclosure relates to the technology of a RISC (Reduced Instruction Set Computer) architecture.

Priority is claimed on Japanese Patent Application No. JP2022-125913 filed on Aug. 5, 2022 under the Paris Convention, and the content of the Japanese Patent Application Publication is incorporated herein by reference under PCT Rule 20.6.

BACKGROUND ART

A RISC represents a computer designed as a reduced instruction set architecture. In particular, the RISC represents a computer that restricts the total number, the number of types, and the formats of instructions and simplifies the processing of each instruction and the addressing of operands. Further, the RISC processes a plurality of stages of processing elements at high speed through pipeline processing. In pipeline processing, processing elements are connected in series so that the output of a front-stage processing element becomes the input of a subsequent-stage processing element. Specifically, a processing element chain is shifted in accordance with the clock and processed in parallel. Further, a buffer is placed between processing elements to synchronize them clock by clock.

FIG. 6 is a schematic diagram for explaining conventional pipeline processing. As shown in FIG. 6, the following processing elements are connected in the four-stage pipeline processing of a RISC.

- (a) Instruction Fetching Unit (IF (Instruction Fetch)): Fetches a machine-language instruction from a memory address that is set in a program counter.
- (b) Decoding Unit (ID (Instruction Decode/register read)): Decodes the machine-language instruction that is output from the instruction fetching unit into a control information (a control bit string in an instruction encoding format).
- (c) Execution Unit (EX (EXecution/address calculation)): Executes the control information that is output from the decoding unit.
- (d) Writing Unit (WB (Write Back)): Performs reading and writing operations to a memory and writing operations to a register.

The instruction fetching unit, the decoding unit, the execution unit, and the writing unit advance their processing while shifting internal information in synchronization with the clock. Processing by these processing elements proceeds in parallel, thus avoiding the wastage of clock cycles.

For example, PTL (Patent Literature) 1 discloses a technology for converting the data structure and code of a CISC (Complex Instruction Set Computer) type processor so as to be applied to a RISC type processor. In this technology, a machine-language instruction is fetched from a series of addresses in a memory and then decoded. Next, when a jump instruction is detected in the fetched machine-language instruction, the address of a register including the target address of the jump destination (destination of the jump) is extracted. Then, before executing the jump instruction, a machine-language instruction is fetched from the target address specified by the register rather than from the series of addresses.

Further, for example, PTL 2 discloses a branching prediction technology for executing branching in one cycle without requiring a complicated circuit configuration and preventing the pipeline of instructions from being disrupted. In this technology, the following stages are executed to handle an interruption routine suitable for a RISC.

(Stage 1) Save the location instruction unit of an instruction that has been input into a pipeline two cycles before the occurrence of interruption.

(Stage 2) Save the location instruction unit of an instruction that has been input one cycle before the occurrence of the interruption.

(Stage 3) Handle an interruption routine.

(Stage 4) Input the instruction existed in the location instruction unit saved in Stage 1 into the pipeline before returning from the interruption routine.

(Stage 5) Input the instruction existed in the location instruction unit saved in Stage 2 into the pipeline before returning from the interruption routine.

CITATION LIST

Patent Literature

[PTL 1] Japanese Patent Application Laid-open No. H06-103067

[PTL 2] Japanese Patent Application Laid-open No. H09-171463

SUMMARY OF INVENTION

Technical Problem

FIG. 7 is a schematic diagram for explaining bubbles that occur as wasted clock cycles when executing a jump instruction.

As shown in FIG. 7, an instruction fetching unit fetches a machine-language instruction from the address of a main memory that is set in a program counter. At this time, the program counter is incremented to the memory address of the next machine-language instruction. Here, it is assumed that the machine-language instruction fetched by the instruction fetching unit is a jump instruction (JAL (Jump And Link) and JALR (Jump And Link Register)). Next, a decoding unit decodes the machine-language instruction of the jump into a control information. Then, an execution unit executes the control information. At this time, the execution unit sets the program counter to the head address of the jump destination while executing the jump control information.

It should be noted that the address of the jump destination is not set in the program counter until the control information of the jump instruction is executed by the execution unit. That is, at the timing when the control information of the jump instruction is executed by the execution unit, the instruction fetching unit and the decoding unit have already advanced their processing in accordance with the incrementation of the program counter. Therefore, the processing executed by the instruction fetching unit and the decoding unit becomes wasteful (bubbles). That is, after the control information for the jump instruction is executed by the execution unit, the head address of the jump destination is set in the program counter, and the instruction fetching unit is required to fetch a machine-language instruction corresponding to the program counter in the next clock cycle again. As a result, pipeline bubbles occur for each execution of a jump instruction in pipeline processing, causing the problem that the processing performance of the processor reduces.

In view of this, the present disclosure has an object of providing a processor and a program recording medium that are configured to control pipeline processing to avoid the occurrence of pipeline bubbles as much as possible even when a jump instruction is executed.

Solution to Problem

According to the present disclosure, there is provided a processor configured to execute pipeline processing in which: an instruction fetcher configured to fetch a machine-language instruction based on a memory address set in a program counter; a decoder configured to decode the machine-language instruction output from the instruction fetcher into a control information; and an executer configured to execute the control information output from the decoder, are connected, the processor comprising:

- a table configured to describe a head address and a head machine-language instruction for each destination of jump; and
- a pipeline controller configured to set, when the executer executing a control information of a jump, an address specifying a second machine-language instruction at a destination of the jump into the program counter by using the table, while to input a head machine-language instruction at the destination of the jump to the decoder.

As another embodiment of the processor in the present disclosure, it is preferable that, after the pipeline controller performs processing, the decoder decodes the head machine-language instruction at the destination of the jump into a control information, and the instruction fetcher fetches the second machine-language instruction at the destination of the jump.

As another embodiment of the processor in the present disclosure, it is preferable that:

- the instruction fetcher, the decoder, and the executer execute a plurality of consecutive machine-language instructions in parallel in synchronization with clock;
- the processor further comprises a first buffer configured to temporarily store a machine-language instruction output from the instruction fetcher in accordance with a first clock and then input the machine-language instruction to the decoder in accordance with a second clock; and
- the pipeline controller sets the head machine-language instruction at the destination of the jump into the first buffer.

As another embodiment of the processor in the present disclosure, it is preferable that:

- the processor is described using a source code written in a hardware description language; and
- the table is created when linking a machine-language instruction of a code of a source of a jump and a machine-language instruction of a code of a destination of the jump.

As another embodiment of the processor in the present disclosure, it is preferable that:

- the processor is described using a source code written in a hardware description language;
- a label for a destination of a jump, and a head machine-language instruction at the destination of the jump are described at a code of a source of the jump in a source code;
- for each label for a destination of a jump, a head address and a head machine-language instruction of the destination of the jump are described in the table; and
- the table is created using only a code of a source of a jump without referring to a code of a destination of the jump.

According to the present disclosure, there is provided a processor configured to execute pipeline processing in which: an instruction fetcher configured to fetch a machine-language instruction based on a memory address set in a program counter; a decoder configured to decode the machine-language instruction output from the instruction fetcher into a control information; and an executer configured to execute the control information output from the decoder, are connected, the processor comprising:

- a table configured to describe a head address, a second machine-language instruction, and a control information of a head machine-language instruction for each destination of jump; and
- a pipeline controller configured to set, when the executer executing a control information of a jump, an address specifying a third machine-language instruction at a destination of the jump into the program counter by using the table, while to input a second machine-language instruction at the destination of the jump to the decoder and to input a control information of a head machine-language instruction at the destination of the jump to the executer.

As another embodiment of the processor in the present disclosure, it is preferable that, after the pipeline controller performs processing, the executer executes the control information of the head machine-language instruction at the destination of the jump in accordance with a first clock, while the decoder decodes the second machine-language instruction at the destination of the jump into a control information, and the instruction fetcher fetches the third machine-language instruction at the destination of the jump in accordance with the first clock.

As another embodiment of the processor in the present disclosure, it is preferable that:

- the instruction fetcher, the decoder, and the executer execute a plurality of consecutive machine-language instructions in parallel in synchronization with clock;
- the processor further comprises: a first buffer configured to temporarily store a machine-language instruction output from the instruction fetcher in accordance with a first clock and then input the machine-language instruction to the decoder in accordance with a second clock; and a second buffer configured to temporarily store a control information output from the decoder in accordance with the first clock and then input the control information to the executer in accordance with the second clock; and
- the pipeline controller sets the second machine-language instruction at the destination of the jump into the first buffer and sets the control information of the head machine-language instruction at the destination of the jump into the second buffer.

As another embodiment of the processor in the present disclosure, it is preferable that:

- the processor is described using a source code written in a hardware description language; and
- the table is created when linking a machine-language instruction of a code of a source of a jump and a machine-language instruction of a code of a destination of the jump.

As another embodiment of the processor in the present disclosure, it is preferable that:

the processor is described by using a source code written in a hardware description language or through wiring logic;

a label for a destination of a jump, and a head machine-language instruction at the destination of the jump, and a second machine-language instruction at the destination of the jump are described at a code of a source of the jump in a source code;

for each label for a destination of a jump, a second machine-language instruction of the destination of the jump, and a control information as a result of converting a head machine-language instruction of the destination of the jump are described in the table; and the table is created using only a code of a source of a jump without referring to a code of a destination of the jump.

According to the present disclosure, there is provided a non-transitory computer-readable storage medium on which is stored a program to be executed by a processor configured to execute pipeline processing in which: an instruction fetcher configured to fetch a machine-language instruction based on a memory address set in a program counter; a decoder configured to decode the machine-language instruction output from the instruction fetcher into a control information; and an executer configured to execute the control information output from the decoder, are connected, the program causing the processor to:

function as a table configured to describe a head address and a head machine-language instruction for each destination of jump; and function as a pipeline controller configured to set, when the executer executing a control information of a jump, an address specifying a second machine-language instruction at a destination of the jump into the program counter by using the table, while to input a head machine-language instruction at the destination of the jump to the decoder.

According to the present disclosure, there is provided a non-transitory computer-readable storage medium on which is stored a program to be executed by a processor configured to execute pipeline processing in which: an instruction fetcher configured to fetch a machine-language instruction based on a memory address set in a program counter; a decoder configured to decode the machine-language instruction output from the instruction fetcher into a control information; and an executer configured to execute the control information output from the decoder, are connected, the program causing the processor to:

function as a table configured to describe a head address, a second machine-language instruction, and a control information of a head machine-language instruction for each destination of jump; and function as a pipeline controller configured to set, when the executer executing a control information of a jump, an address specifying a third machine-language instruction at a destination of the jump into the program counter by using the table, while to input a second machine-language instruction at the destination of the jump to the decoder and to input a control information of a head machine-language instruction at the destination of the jump to the executer.

Advantageous Effects of Invention

The processor and the program recording medium according to the present disclosure can control pipeline processing to avoid the occurrence of pipeline bubbles as much as possible even when a jump instruction is executed.

DESCRIPTION OF EMBODIMENTS

Hereinafter, embodiments for carrying out the present invention will be described in detail using the drawings.

Figure 1:
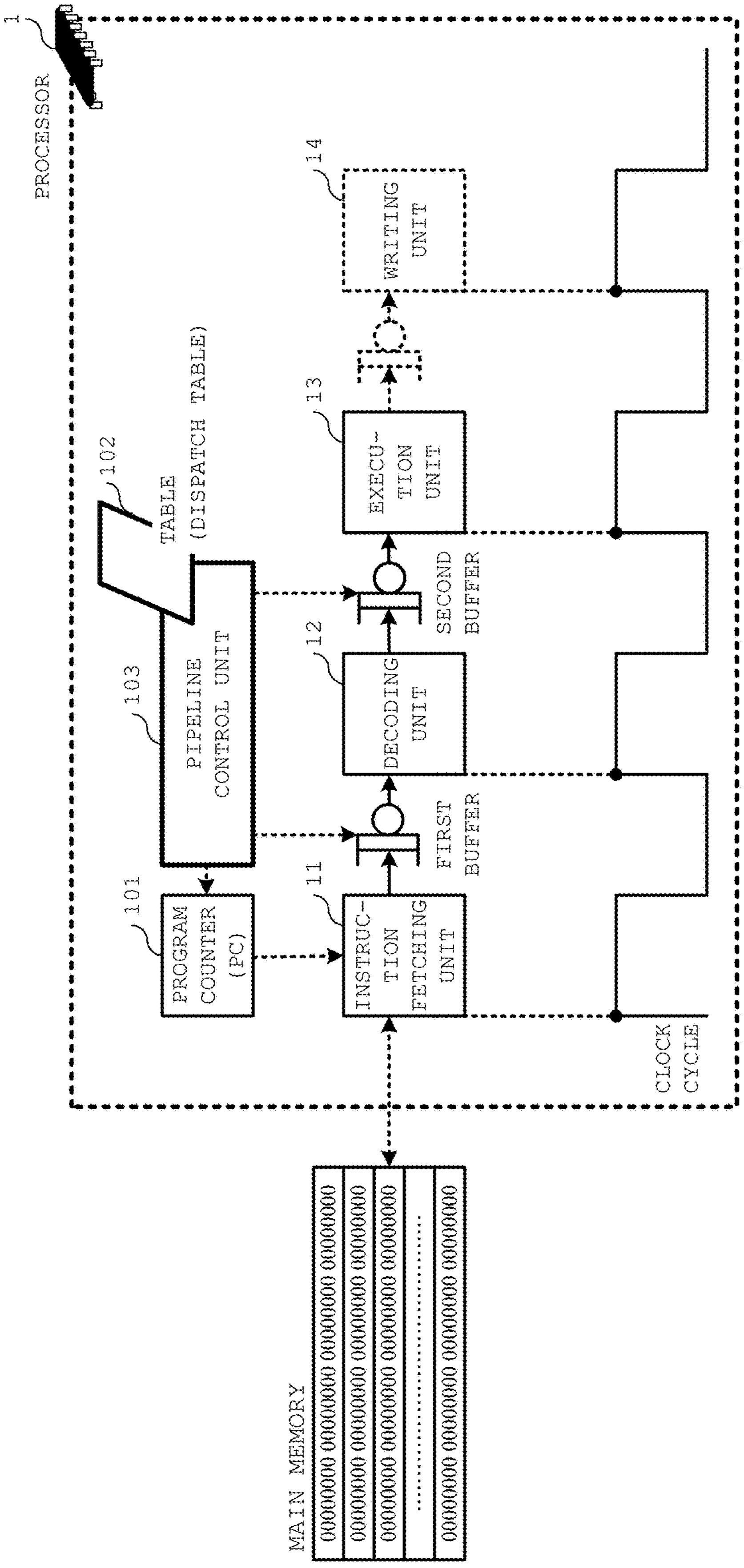
FIG. 1 is a functional configuration diagram of a processor in the present disclosure.

FIG. 1 is a functional configuration diagram of a processor in the present disclosure.

As shown in FIG. 1, a processor 1 has a program counter 101, an instruction fetching unit 11, a decoding unit 12, an execution unit 13, and a writing unit 14 as the functional configuration units of a general RISC. This configuration is generally referred to as a four-stage pipeline. Further, the processor 1 also has a table 102 and a pipeline control unit 103 as the characteristics of the present disclosure. In other words, a program executed by the processor 1 causes the processor 1 to function as the table 102 and the pipeline control unit 103.

The processor 1 may be a PLD (Programmable Logic Device), an FPGA (Field Programmable Gate Array), or an LSI (Large Scale Integration) and may be described using a hardware description language on the basis of the technique for designing the circuit of semiconductor chips. The hardware description language enables the description of the configuration and operating conditions of elements included in a circuit, the wiring between the elements, and the like using syntax and notation similar to those of programming languages. By writing a circuit diagram into a PLD, an FPGA, or an LSI, it is possible to manufacture a processor chip.

The present disclosure includes two embodiments as described below.

<First Embodiment>: The pipeline control unit 103 controls a program counter referred to by the instruction fetching unit 11 and a machine-language instruction that is input to the decoding unit 12.

<Second Embodiment>: The pipeline control unit 103 controls a program counter referred to by the instruction fetching unit 11, a machine-language instruction that is input to the decoding unit 12, and a control information (a control bit string in an instruction encoding format) that is input to the execution unit 13.

First Embodiment

Figure 2:
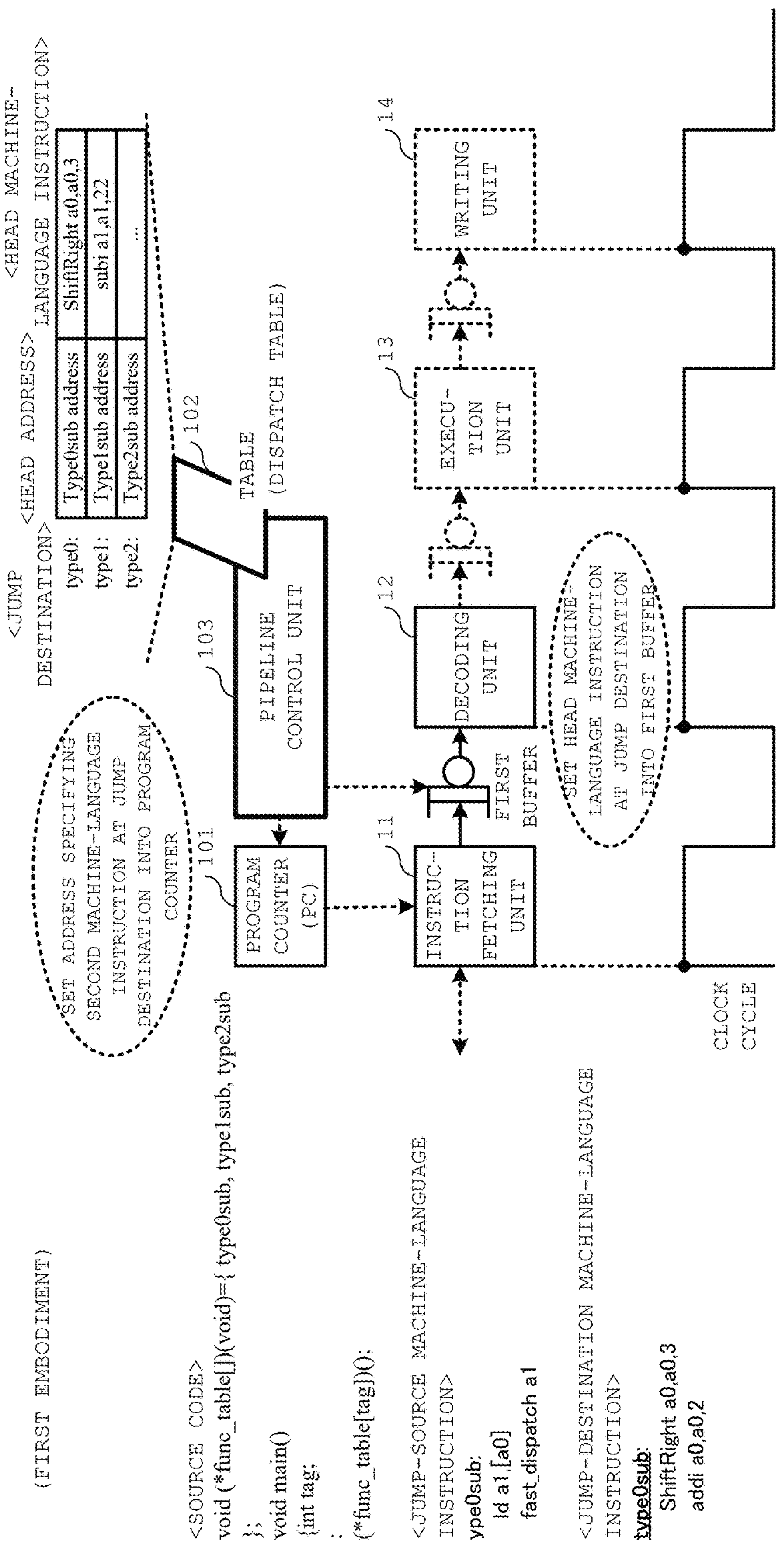
FIG. 2 is a schematic diagram for explaining the pipeline control unit in the first embodiment.

FIG. 2 is a schematic diagram for explaining the pipeline control unit in the first embodiment.

As shown in FIG. 2, the pipeline control unit 103 controls a program counter referred to by the instruction fetching unit 11 and a machine-language instruction that is input to the decoding unit 12.

[Table 102]

The table 102 is generally referred also to as a dispatch table and describes (contains) instructions at jump destinations (or subroutines). The table 102 is stored in a core unit 10 of the processor 1 as a volatile or non-volatile memory and realizes small-capacity and high-speed access.

As shown in FIG. 2, a first source code written in a software description language, as well as a jump-source machine-language instruction and a jump-destination machine-language instruction that are part of the result of compiling the first source code, are described.

```
<First Source Code>
  void type0sub( ){printf("000¥n"); }
  void type1sub( ){printf("111¥n"); }
  void type2sub( ){printf("222¥n"); }
  void (*func_table[ ])(void)={ type0sub, type1sub,
type2sub };
  void main( )
  {int tag;
      :
    (*func_table[tag])( );
  }
<Jump-Source Machine-Language Instruction>
  ld a1, [a0] ; load a jump-destination address specified by
a0 (tag) into a1
  fast_dispatch a1 ; refer to the dispatch table and jump
to the address specified by a1 (set the program counter to the
address specified by a1)
<Jump-Destination Machine-Language Instruction>
  type0sub: ; a jump-destination label (that becomes the
head address of the jump destination)
        ShiftRight a0,a0,3 ; a head machine-language
instruction at the jump destination (destination of the jump)
        addi a0,a0,2 ; a second machine-language instruction
at the jump destination
```

Further, the first source code may be described as, for example, the following second source code.

```
  <Second Source Code>
    switch(tag){
      case 0: jump type0sub( ); break;
      case 1: jump type1sub( ); break;
      case 2: jump type2proc( ); break;
    }
  <Jump-Source Machine-Language Instruction>
    ld a1, [a0] ; load a jump-destination address specified by
  a0 into a1
    jmp a1 ; jump to the address specified by a1 (set the
  program counter to the address specified by a1)
  <Jump-Destination Machine-Language Instruction>
    type0sub: ; a jump-destination label (that becomes the
  head address of the jump destination)
        ShiftRight a0,a0,3 ; a head machine-language
  instruction at the jump destination
        addi a0,a0,2 ; a second machine-language instruction
  at the jump destination
```

In the table 102, a <head address> and a <second machine-language instruction> are described for each jump (or subroutine). For example, the following contents are described for each jump-destination label.

```
<Jump Destination> - <Head Address> - <Head Machine-language
Instruction>
  type0 - type0sub address - ShiftRight a0,a0,3
  type1 - type1sub address - subi a1,a1,22
  type2 - type2sub address - .....
```

It is assumed that the head machine-language instructions of the jump-destination codes (codes of the jump destination) have been determined.

Note that in the table 102, it is preferable that jumps (and subroutines) with higher calling frequencies are registered more reliably. As a result, it is possible to avoid, as much as possible, the occurrence of bubble clocks for each call of the jumps or the like registered in the table 102, thereby achieving high-speed processing across the entire processor.

[Pipeline Control Unit 103]

The pipeline control unit 103 performs the following two controls.

<Control 11> When the control information of a jump has been executed by the execution unit 13, the unit 103 sets an address specifying the second machine-language instruction at the jump destination into the program counter by using the table 102.

<Control 12> The unit 103 inputs the head machine-language instruction at the jump destination to the decoding unit 12.

Then, as pipeline processing, the instruction fetching unit 11 and the decoding unit 12 advance the processing while shifting in synchronization with the clock.

After the pipeline control unit 103 performs its processing, the processing proceeds as follows.

<Processing 11> The decoding unit 12 decodes the head machine-language instruction at the jump destination into a control information.

<Processing 12> The instruction fetching unit 11 fetches the second machine-language instruction at the jump destination.

Further, the instruction fetching unit 11, the decoding unit 12, and the execution unit 13 execute a plurality of consecutive machine-language instructions in parallel in synchronization with the clock. Here, as shown in FIG. 2, a first buffer is placed between the instruction fetching unit 11 and the decoding unit 12. The first buffer temporarily stores a machine-language instruction that is output from the instruction fetching unit 11 in accordance with a first clock, and then inputs the machine-language instruction to the decoding unit 12 in accordance with a second clock. In the control 12 described above, the pipeline control unit 103 sets the head machine-language instruction at the jump destination into the first buffer.

As a result, the processing by the decoding unit 12 can start without fetching, from a memory, the head machine-language instruction of a jump-destination code. In the transition from a jump-destination address to a jump-destination code, it is possible to execute instructions at high speed without resulting in a wasted clock that is a bubble.

Figure 3:
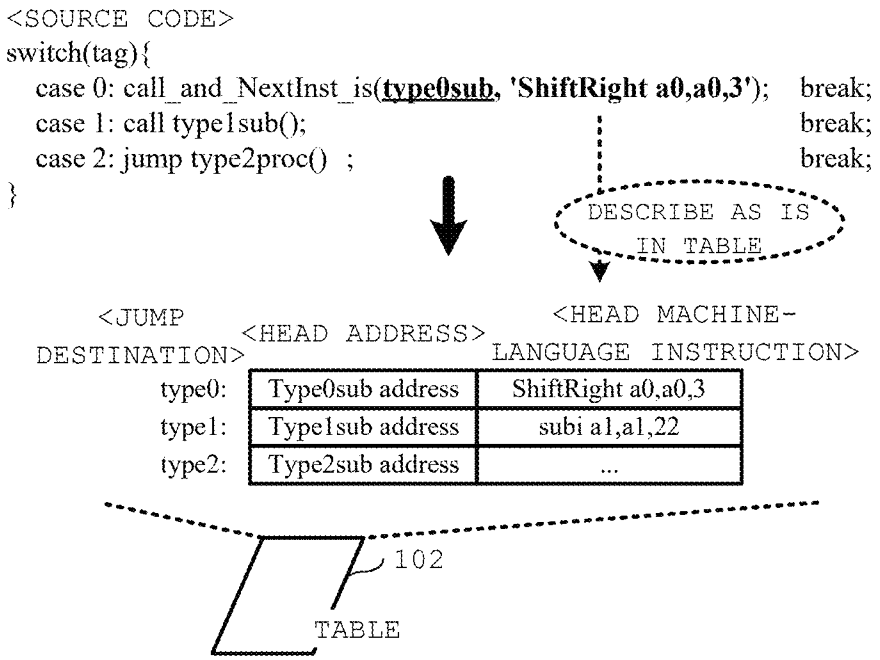
FIG. 3 is a schematic diagram for explaining the table shown in FIG. 2.

FIG. 3 is a schematic diagram for explaining the table shown in FIG. 2.

The table 102 is created when linking the machine-language instruction of a jump-source code (code of a jump source, code of the source of a jump) and the machine-language instruction of a jump-destination code (code of a jump destination, code of the destination of a jump). The processor in the present embodiment is described using a source code written in a hardware description language. The source code is converted into an execution format through being compiled and being "linked" with a plurality of libraries. Of course, the processor is not limited to being described using a hardware description language but can also be realized through wiring logic.

Further, the table 102 can also be created using only a jump-source code without referring to a jump-destination code. As shown in FIG. 3, a <jump-destination label (label for the jump destination)> and a <head machine-language instruction at the jump destination> are described at a jump-source code in a source code.

```
<Source Code>
  switch(tag){
    case 0: call_and_NextInst_is(type0sub, 'ShiftRight
a0,a0,3'); break;
    case 1: call type1sub( ); break;
    case 2: jump type2proc( ); break;
  }
```

In the table 102, a <head address> and a <head machine-language instruction at the jump destination> are described for each jump-destination label.

```
<Jump Destination> - <Head Address> - <Head Machine-Language
Instruction>
  type0 - type0sub address - ShiftRight a0,a0,3
```

Second Embodiment

Figure 4:
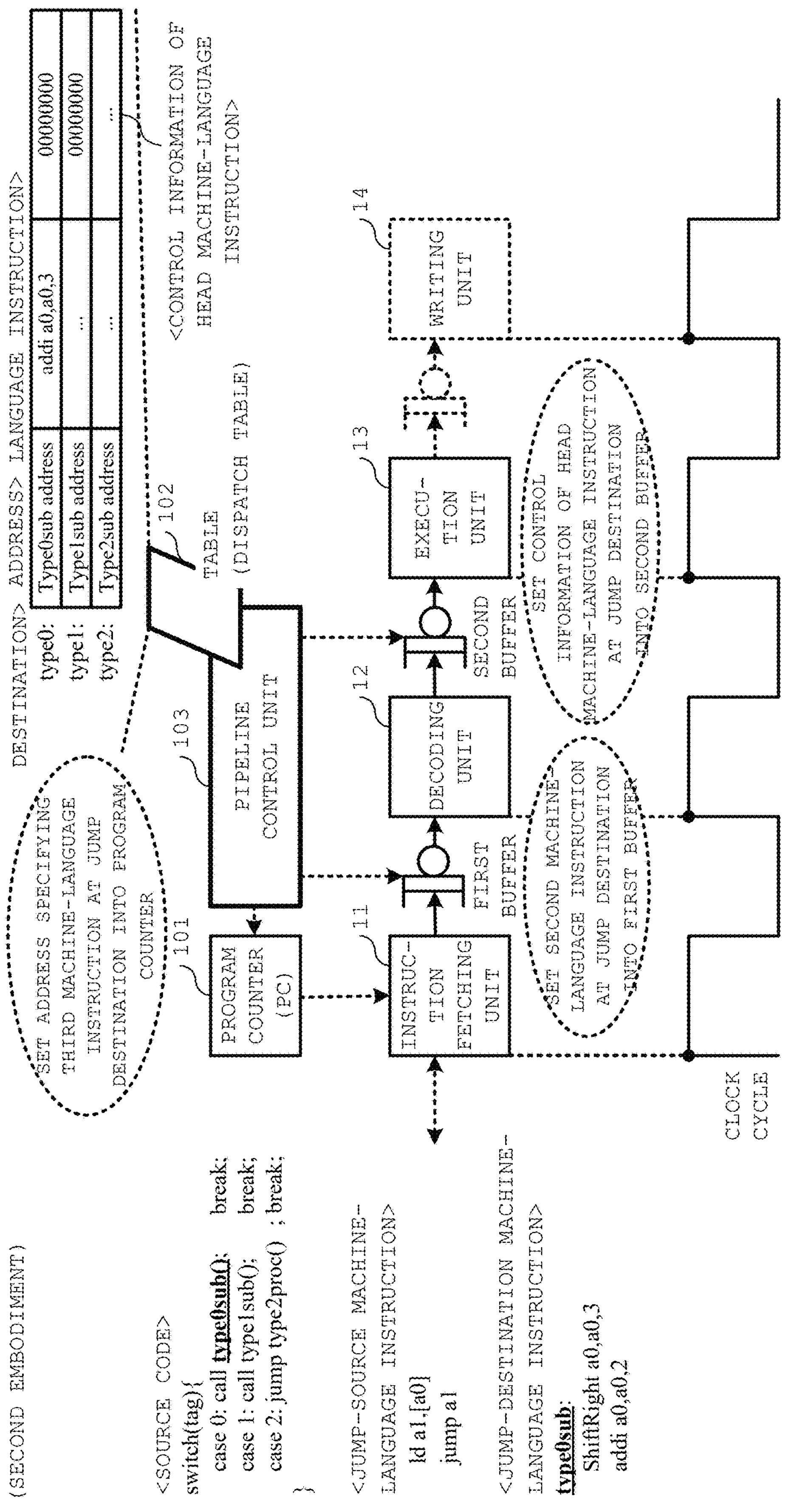
FIG. 4 is a schematic diagram for explaining the pipeline control unit in the second embodiment.

FIG. 4 is a schematic diagram for explaining the pipeline control unit in the second embodiment.

As shown in FIG. 4, the pipeline control unit 103 controls a program counter referred to by the instruction fetching unit 11, a machine-language instruction that is input to the decoding unit 12, and a control information (a control bit string in an instruction encoding format) that is input to the execution unit 13.

[Table 102]

In the table 102, a <head address>, a <second machine-language instruction>, and a <control information of head machine-language instruction> are described for each jump (or subroutine) destination. For example, the following contents are described for each jump-destination label.

```
<Jump Destination> - <Head Address> - <Second Machine-Language
Instruction> -
  type0 - type0sub address - addi a0,a0,3 -
  type1 - type1sub address - ..... -
  type2 - type2sub address - ..... -
<Control Information of Head Machine-Language Instruction>
  00000000
  .....
  .....
```

It is assumed that the head machine-language instructions and the second machine-language instructions of the jump-destination codes have been determined.

[Pipeline Control Unit 103]

The pipeline control unit 103 performs the following three controls.

<Control 21> When the control information of a jump has been executed by the execution unit 13, the unit 103 sets an address specifying the third machine-language instruction at the jump destination into the program counter by using the table 102.

<Control 22> The unit 103 inputs the second machine-language instruction of the jump to the decoding unit 12.

<Control 23> The unit 103 inputs the control information of the head machine-language instruction at the jump destination to the execution unit 13.

Then, through pipeline processing, the instruction fetching unit 11, the decoding unit 12, and the execution unit 13 together execute consecutive machine-language instructions in parallel in synchronization with the clock.

After the processing by the pipeline control unit 103, the processing proceeds as follows.

<Processing 21> The execution unit 13 executes the control information of the head machine-language instruction at the jump destination.

<Processing 22> The decoding unit 12 decodes the second machine-language instruction at the jump destination into a control information.

<Processing 23> The instruction fetching unit 11 fetches the third machine-language instruction at the jump destination.

As shown in FIG. 4, the <control information of head machine-language instruction> described in the table 102 is a decoded bit string of the head machine-language instruction at the jump destination. Therefore, the control information is immediately processible by the execution unit 13 and does not require any clock for decoding. Also, the <second machine-language instruction> is immediately processible by the decoding unit 12 and does not require any clock for instruction fetching. That is, it is possible to avoid, as much as possible, the occurrence of pipeline bubbles in processing by the instruction fetching unit 11 and the decoding unit 12.

Further, the instruction fetching unit 11, the decoding unit 12, and the execution unit 13 execute a plurality of consecutive machine-language instructions in parallel in synchronization with the clock. Here, as shown in FIG. 4, a first buffer is placed between the instruction fetching unit 11 and the decoding unit 12, and a second buffer is placed between the decoding unit 12 and the execution unit 13. The first buffer temporarily stores a machine-language instruction that is output from the instruction fetching unit 11 in accordance with a first clock, and then inputs the machine-language instruction to the decoding unit 12 in accordance with a second clock. The second buffer temporarily stores the control information that is output from the decoding unit 12 in accordance with the first clock, and then outputs the control information to the execution unit 13 in accordance with the second clock. In the control 22 described above, the pipeline control unit 103 sets the second machine-language instruction of the jump into the first buffer. Further, in the control 23 described above, the pipeline control unit 103 sets the control information of the head machine-language instruction at the jump destination into the second buffer.

As a result, the processing by the decoding unit 12 and the execution unit 13 can start without fetching, from a memory, the <head machine-language instruction> and the <second machine-language instruction> of the jump-destination code. In the transition from a jump-destination address to a jump-destination code, it is possible to execute instructions at high speed without resulting in two wasted clocks that are bubbles.

Figure 5:
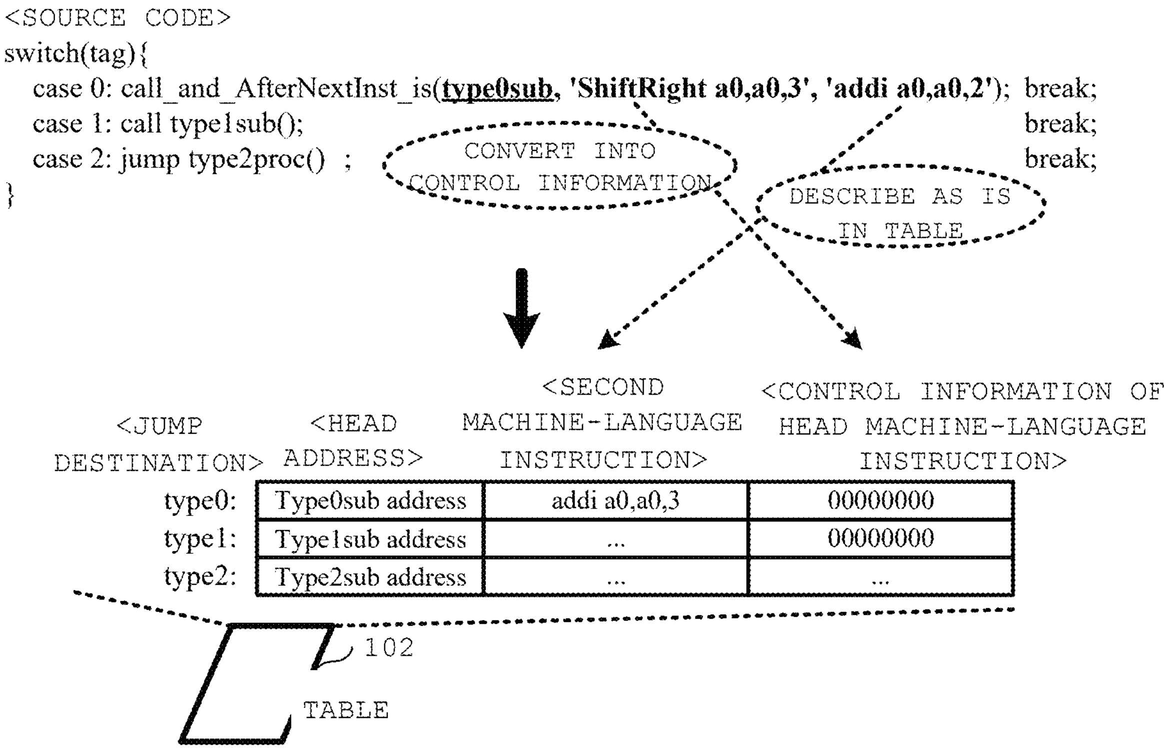
FIG. 5 is a schematic diagram for explaining the table shown in FIG. 4.
Figure 6:
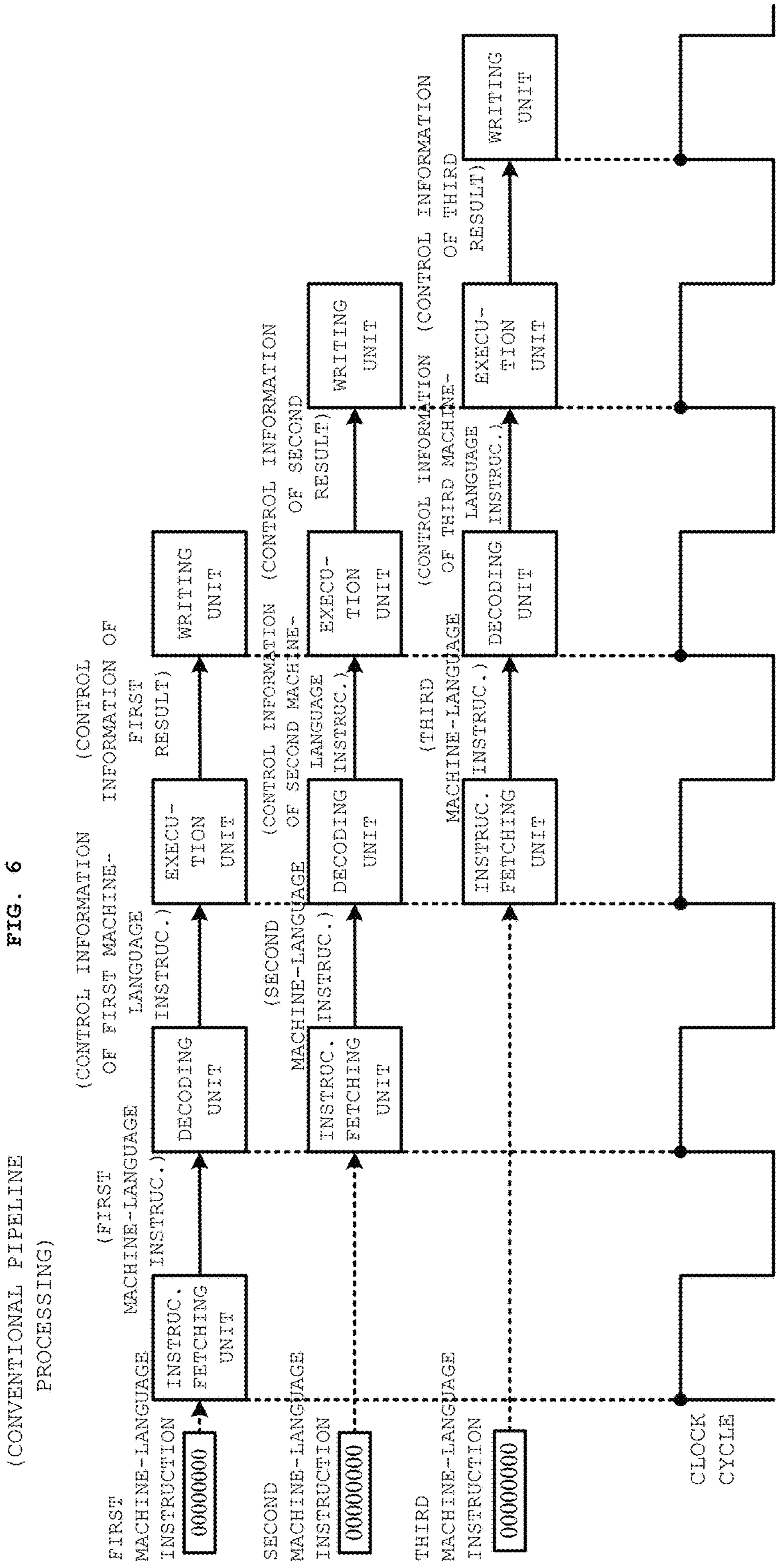
FIG. 6 is a schematic diagram for explaining conventional pipeline processing.
Figure 7:
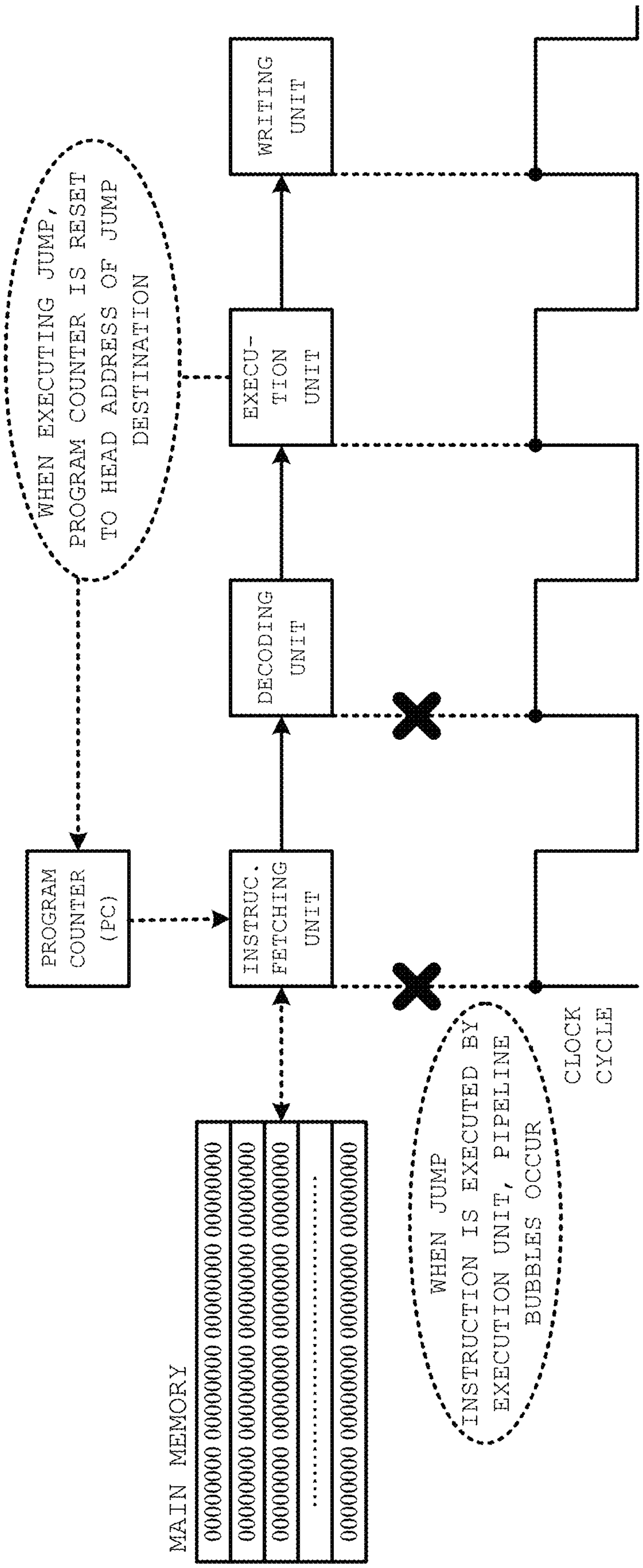
FIG. 7 (PRIOR ART)
FIG. 7 is a schematic diagram for explaining bubbles that occur as wasted clock cycles when executing a jump instruction.

FIG. 5 is a schematic diagram for explaining the table shown in FIG. 4.

The table 102 is created when linking the machine-language instruction of a jump-source code and the machine-language instruction of a jump-destination code.

Further, the table 102 can also be created using only a jump-source code without referring to a jump-destination code. As shown in FIG. 5, a <jump-destination label (label for the jump destination)>, a <head machine-language instruction at the jump destination>, and a <second machine-language instruction at the jump destination> are described at a jump-source code in a source code.

```
<Source Code>
  switch(tag){
    case 0: call__and__AfterNextInst__is(type0sub,
'ShiftRight a0,a0,3', 'addi a0,a0,2'); break;
    case 1: call type1sub( ); break;
    case 2: jump type2proc( ); break;
  }
```

In the table 102, a <head address>, a <second machine-language instruction at the jump destination>, and a <control information of the head machine-language instruction at the jump destination> are described for each jump-destination label.

```
<Jump Destination> - <Head Address> - <Second Machine-Language
Instruction> -
  type0 - type0sub address - addi a0,a0,3 -
<Control Information of Head Machine-Language Instruction>
  00000000...
```

The control information is a result of converting in advance a machine-language instruction by the processing algorithm of the decoding unit 12.

According to the second embodiment, it is possible to speed up, in particular, an interpreter of Java (registered trademark) virtual machine (VM), a Lisp machine, a Prolog-compiled machine code, or the like. That is, it is possible to dispatch a corresponding processing routine at high speed on the basis of control information in the Java virtual machine. In an interpreter method, the sequential processing of machine-language instructions requires a significant burden, making high-speed processing difficult. In most cases, the Jave virtual machine interpreter or Lisp refers to tag information added to data objects and dispatches machine language routines. Machine-language instructions of the tag dispatch portions can be directly generated as, for example, control information for a RISC processor. By directly pre-describing such control information in the table 102, it is possible to speed up instruction execution without causing pipeline bubbles when jumping (or entering subroutine).

As described in detail above, the processor and the program according to the present disclosure enable pipeline processing to be controlled to avoid the occurrence of pipeline bubbles as much as possible even when a jump instruction is executed.

The foregoing embodiments are by way of examples of the present disclosure only and are not intended to limit thereto, thus many widely different alternations and modifications of the present disclosure may be constructed. Accordingly, the present disclosure is to be limited only as defined by the following claims and equivalents thereto.

REFERENCE SIGNS LIST

1 processor; 10 core unit; 101 program counter; 102 table; 103 pipeline control unit; 11 instruction fetching unit; 12 decoding unit; 13 execution unit; and 14 writing unit.

The invention claimed is:

1. A processor configured to comprise: an instruction fetcher configured to fetch a machine-language instruction based on a memory address set in a program counter; a decoder configured to decode the machine-language instruction output from the instruction fetcher into a control information; and an executer configured to execute the control information output from the decoder, and execute pipeline processing, the processor being manufactured by being described using a source code written in a hardware description language, the processor further comprising:

a table created when linking a machine-language instruction of a code at a source of a jump and a machine-language instruction of a code at a destination of the jump and configured to describe, for each destination of the jump, a head address of a code at the destination of the jump and a head machine-language instruction of the code at the destination of the jump in advance before a program containing the code at the source of the jump is executed; and a pipeline controller configured to set, when the executer is executing a control information of a jump, an address specifying a second machine-language instruction of a code at a destination of the jump into the program counter by using the table, while to input a head machine-language instruction of the code at the destination of the jump to the decoder by using the table, the head machine-language instruction of the code at the destination of the jump being described in the table in advance before the program is executed and not being fetched from a memory.

2. A processor configured to comprise: an instruction fetcher configured to fetch a machine-language instruction based on a memory address set in a program counter; a decoder configured to decode the machine-language instruction output from the instruction fetcher into a control information; and an executer configured to execute the control information output from the decoder, and execute pipeline processing, the processor being manufactured by being described using a source code written in a hardware description language, the processor further comprising:

a table configured to describe, for each destination of a jump, a head address of a code at the destination of the jump and a head machine-language instruction of the code at the destination of the jump; and a pipeline controller configured to set, when the executer is executing a control information of a jump, an address specifying a second machine-language instruction of a code at a destination of the jump into the program counter by using the table, while to input a head machine-language instruction of the code at the destination of the jump to the decoder by using the table, the head machine-language instruction of the code at the destination of the jump being described in the table in advance before a program containing a code at a source of the jump is executed and not being fetched from a memory, a label for a destination of a jump, and a head machine-language instruction at the destination of the jump being described at a code of a source of the jump, for each label for a destination of a jump, a head address and a head machine-language instruction of a code at the destination of the jump being described in the table, and the table being created using only a code at a source of a jump without referring to a code at a destination of the jump, in advance before the program is executed.

3. A processor configured to comprise: an instruction fetcher configured to fetch a machine-language instruction based on a memory address set in a program counter; a decoder configured to decode the machine-language instruction output from the instruction fetcher into a control information; and an executer configured to execute the control information output from the decoder, and execute pipeline processing, the processor further comprising:

a table configured to describe, for each destination of a jump, a head address of a code at the destination of the jump, a second machine-language instruction of the code at the destination of the jump, and a control information of a head machine-language instruction of the code at the destination of the jump in advance before a program containing a code at a source of the jump is executed; and a pipeline controller configured to set, when the executer is executing a control information of a jump, an address specifying a third machine-language instruction of a code at a destination of the jump into the program counter by using the table, while to input a second machine-language instruction of the code at the destination of the jump to the decoder and to input a control information of a head machine-language instruction of the code at the destination of the jump to the executer by using the table the second machine-language instruction of the code at the destination of the jump being described in the table in advance before the program is executed and not being fetched from a memory.

4. The processor as claimed in claim 3, wherein, after the pipeline controller performs processing, the executer executes the control information of the head machine-language instruction of the code at the destination of the jump in accordance with a first clock, while the decoder decodes the second machine-language instruction of the code at the destination of the jump into a control information, and the instruction fetcher fetches the third machine-language instruction of the code at the destination of the jump in accordance with the first clock.

5. The processor as claimed in claim 4, wherein the instruction fetcher, the decoder, and the executer execute a plurality of consecutive machine-language instructions in parallel in synchronization with clock, the processor further comprising: a first buffer configured to temporarily store a machine-language instruction output from the instruction fetcher in accordance with a first clock and then input the machine-language instruction to the decoder in accordance with a second clock; and a second buffer configured to temporarily store a control information output from the decoder in accordance with the first clock and then input the control information to the executer in accordance with the second clock, and wherein the pipeline controller sets the second machine-language instruction of the code at the destination of the jump into the first buffer and sets the control information of the head machine-language instruction of the code at the destination of the jump into the second buffer.

6. The processor as claimed in claim 3, wherein the processor is manufactured by being described using a source code written in a hardware description language, and wherein the table is created when linking a machine-language instruction of a code at-a source of a jump and a machine-language instruction of a code at-a destination of the jump.

7. The processor as claimed in claim 3, wherein the processor is manufactured by being described using a source code written in a hardware description language, wherein a label for a destination of a jump, a head machine-language instruction at the destination of the jump, and a second machine-language instruction at the destination of the jump are described at a code of a source of the jump, wherein, for each label for a destination of a jump, a second machine-language instruction of a code at the destination of the jump, and a control information as a result of converting a head machine-language instruction of the code at the destination of the jump are described in the table, and wherein the table is created using only a code at-a source of a jump without referring to a code at-a destination of the jump.

* * * * *